(12) United States Patent
Schutzer

(10) Patent No.: US 6,970,853 B2
(45) Date of Patent: Nov. 29, 2005

(54) METHOD AND SYSTEM FOR STRONG, CONVENIENT AUTHENTICATION OF A WEB USER

(75) Inventor: Daniel Schutzer, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 749 days.

(21) Appl. No.: 09/875,651

(22) Filed: Jun. 6, 2001

(65) Prior Publication Data

US 2002/0053035 A1     May 2, 2002

Related U.S. Application Data

(60) Provisional application No. 60/209,664, filed on Jun. 6, 2000.

(51) Int. Cl.$^7$ .......................... H04L 9/00; G06F 17/60

(52) U.S. Cl. .................. 705/67; 713/159; 713/172

(58) Field of Search ..................... 713/155–159, 713/168, 172, 182, 185, 186, 201, 202; 705/65–69

(56) References Cited

U.S. PATENT DOCUMENTS 5,850,442 A * 12/1998 Muftic .................... 705/65
6,067,621 A *  5/2000 Yu et al. .................. 713/172

OTHER PUBLICATIONS

Roe, M., "Performance of Symmetric Ciphers and One-way Hash Functions," Fast Encryption Software '93, 1993.*
Chan, S. C., "An Overview of Smart Card Security," 1998, available at http://home.hkstar.com/~alanchan/papers/smartCardSecurity.*
Podesta et al, "Design and Implementation of a Certificate Authority Frontend," Computer Security, 1999.*

* cited by examiner

Primary Examiner—Gregory Morse
Assistant Examiner—John Elmore
(74) Attorney, Agent, or Firm—George T. Marcou; Kilpatrick Stockton LLP

(57) ABSTRACT

A method and system for strong, convenient authentication of a web user makes use, for example, of a computing device, such as a user's personal computer (PC), coupled over a network, such as the Internet, to one or more servers, such as the host server of an authenticating authority, as well as one or more databases of the authenticating authority. The authentication process is broken into three phases, namely a registration phase, an enrollment phase, and a transaction authentication phase, with each phase being less intrusive and less secure than the preceding phase. In the registration phase, an authenticating authority registers the user based upon identification of the user using a strong authentication technique and provides an authenticating token to the user, which can be used in the enrollment phase to enroll one or more user devices for the user. Thereafter, in the transaction authentication phase, the authenticating authority can authenticate the user for a transaction based on presentation by the user of a user password via the enrolled user device.

36 Claims, 8 Drawing Sheets

Stages Or Phases of Authentication

10 ——— Registration

| |
|---|
| 16 —— Biometrics |
| 18 —— Shared Secrets |

FIG. 2

METHOD AND SYSTEM FOR STRONG, CONVENIENT AUTHENTICATION OF A WEB USER

PRIORITY APPLICATION

This application claims the benefit of U.S. Provisional Application No. 60/209,664 filed Jun. 6, 2000, entitled "Method and System for Strong, Convenient Authentication of a Web User", which is incorporated herein by this reference.

FIELD OF THE INVENTION

The present invention relates generally to the field of electronic commerce and more particularly to a method and system for strong but convenient authentication for a user on a global network, such as the Internet.

BACKGROUND OF THE INVENTION

In the world of electronic commerce, there is a need for strong authentication in a way that makes it difficult for a third party to spoof what a user is doing. Currently, when people speak of "strong authentication," they are normally talking about a situation in which it is necessary to have software or hardware, or both, or biometrics and the like, and every time the user wishes to perform a transaction, such as a payment, he or she must use the particular type of strong authentication.

It is possible to furnish all users a piece of hardware, such as a mini computer on a chip that can be carried in a user's pocket and which uses biometrics or the like, so that the user can communicate that he or she is the proper user. Therefore, in order for a third party to impersonate the user, it is necessary for the third party to steal the user's device and also have the same physical attributes as the user. Without that, the third party could not impersonate the user.

However, it is necessary for each user to buy such a device and carry it with him or her, and it would have to interoperate, for example, with a personal computer (PC) or some other way in which the user wants to interact through his or her device. It would also be necessary for the device to be fast. At the moment, that would not be an easy thing to accomplish, although it could change over time as technology advances. These devices are quite costly and do not interface very easily, for example, with different PCs, palm pilots, and Internet phones. Not only are such devices expensive, but also performance penalties, such as time delays, are typically involved in getting the devices to work properly.

Today, a dilemma regarding authentication over the web involves a desire for stronger authentication than a password that can be guessed or stolen enabled by authentication technology, such as biometrics, digital signatures and signature engines stored in hardware tokens, utilizing more than one shared secret. However, these solutions require one or more of downloading and installation of large and complex software files, special hardware tokens and readers, memorization of seldom used shared information, and dealing with difficult issues surrounding items being lost, stolen or revoked.

SUMMARY OF THE INVENTION

It is a feature and advantage of the present invention to provide a method and system for authenticating a user over the web which is stronger than a simple password, which can be stolen or guessed, yet which is also relatively easy and convenient to use.

To achieve the stated and other features, advantages and objects, an embodiment of the present invention breaks the authentication process into three phases, namely a registration phase, an enrollment phase, and an authentication phase, with each phase being less intrusive and less secure than the preceding phase. The least secure phase is the easiest and quickest to use, and if it becomes compromised, it is the easiest and fastest to update. The most important authentication information is kept primarily in the registration phase, which is the least frequently used. The present invention makes use, for example, of a computing device, such as a user's personal computer (PC), coupled over a network, such as the Internet, to one or more servers, such as the host server of an authenticating authority, as well as one or more databases of the authenticating authority.

In an embodiment of the present invention, the authenticating authority registers the user based upon identification of the user using a strong authentication technique, such as one employing biometric information and/or shared secret information. In one aspect of the registration process, the authenticating authority sends a special identification code to the user by post that can be used only within a predetermined time frame by the user. In another aspect of the registration process, the identification of the user is based at least in part on the user's answer to a question posed by the authenticating authority about a specific matter which only the user would know. In still another aspect of the registration process, the biometric information and/or shared secret information is/are combined with one or more unique, known attributes of the user and a secret entered and known only by the authenticating authority.

The biometric information, such as user fingerprint or handwriting information, and/or shared secret information can be received by the authenticating authority from the user at a transaction terminal, such as an automatic teller machine (ATM), using a transaction terminal card and user password and/or personal identification number (PIN) entered, for example, through a control device that identifies the user. An important aspect of the registration process is the providing of an authenticating token to the user by the authenticating authority in connection with the user registration. The authenticating token consists, for example, of a one-way hash (or an index derived from the one-way hash) of user identification information known only to the authenticating authority and the user, such as the biometric information and/or shared secret information and is produced using, for example, a Secure Hash Algorithm (SHA) or a message digest algorithm (MD-5).

The authenticating token enables the user to enroll one or more computing devices from which the user can perform transactions, such as a laptop computer, a personal computer (PC), a set-top box, and/or a personal data assistant by logging on from the particular device, for example, to a web site of the authenticating authority and presenting the authentication token and a user password to the authenticating authority. In an aspect of the enrollment process, the authenticating authority also produces a hash of user information consisting, for example, of identification information for the user device and the user password.

Once the user's device or devices is/are enrolled, the user can be authenticated for a transaction by the authenticating authority based simply on presentation by the user of a user password via the enrolled user device. In one aspect of the transaction authentication process, when the user logs on to the authenticating authority from one of the user's enrolled devices with the user password, a hash of user information is received by the authenticating authority via the enrolled user device consisting, for example, of identification information for the user device. The authenticating authority performs a look-up to confirm that a pre-defined relationship exists between the user password and the enrolled user device. If the authenticating authority recognizes the user password as being associated with the particular enrolled device, the user is authenticated for the transaction.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 2 is a table which shows examples of strong authentication measures for an embodiment of the present invention;

DETAILED DESCRIPTION

Figure 1:
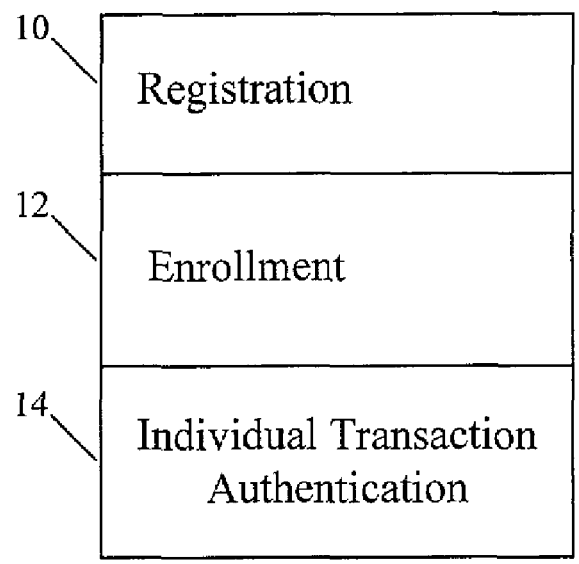
FIG. 1 is a table which shows examples of stages or phases of strong convenient authentication for an embodiment of the present invention.

Referring now in detail to an embodiment of the invention, an example of which is illustrated in the accompanying drawings, as illustrated in FIG. 1, an embodiment of the present invention involves breaking authentication into stages or phases of registration 10, enrollment 12, and the final individual transaction authentication 14, with a great deal of strength in the registration and enrollment stages 10, 12, and a much quicker authentication stage 14. Typically, a user does not mind having to go to a more onerous effort in terms of registering or setting up. However, the user does mind having to go to these extremes when the user is required to use these techniques, which are stronger and typically represent a substantial cost in performance and usability problems, every time the user wants to do something simple, such as making a purchase. Thus, the authentication stage 14 is less intrusive and secure than the enrollment stage 12, and the enrollment stage 12 is less intrusive and secure than the registration stage 10. The final individual transaction authentication 14 is the least secure and the easiest and quickest to use, and if it becomes compromised, it is the easiest and fastest to update. The most important authentication information is kept the most secure (and least frequently used), for example, back in the registration stage 10.

In an embodiment of the present invention, authentication is stronger because the process that is used to register and enroll or re-register and re-enroll is not used very frequently and is therefore less likely to be compromised. In other words, with use of the same process over and over again in a very frequent manner, the chances of a third party penetrating and compromising the process are greater because of the greater frequency of use. In each phase of authentication for an embodiment of the present invention, the process becomes less intrusive, and each one of these phases has a higher frequency of use. A user has less tolerance for something that is intrusive, hard to use, time consuming, and/or expensive to carry out. Thus, each phase of the authentication process for an embodiment of the present invention is less intrusive and less secure. The least secure phase, which is transaction authentication 14, is the easiest approach to use, and if it is compromised, it is the easiest and fastest to update by simply re-enrolling or re-registering.

Figure 3:
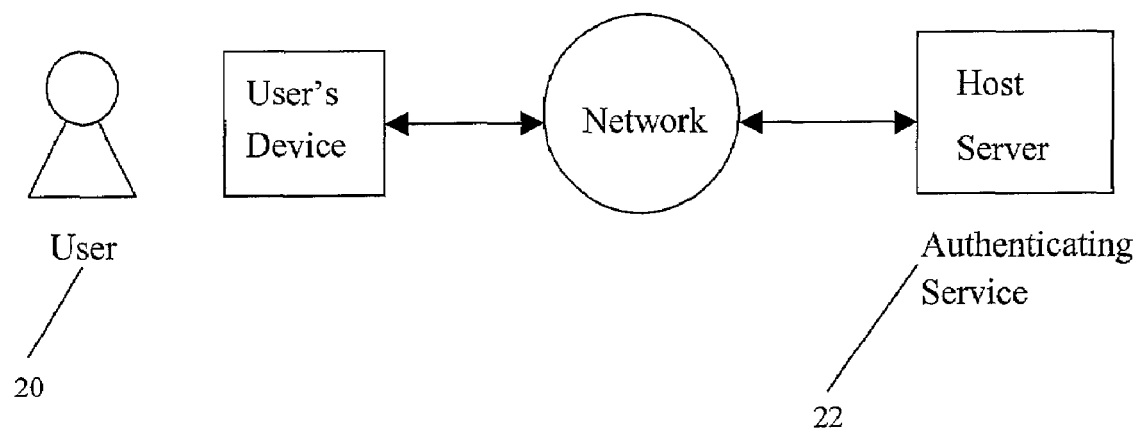
FIG. 3 is a schematic diagram showing an example of key components and the flow of information between key components in the registration process for an embodiment of the present invention.
Figure 4:
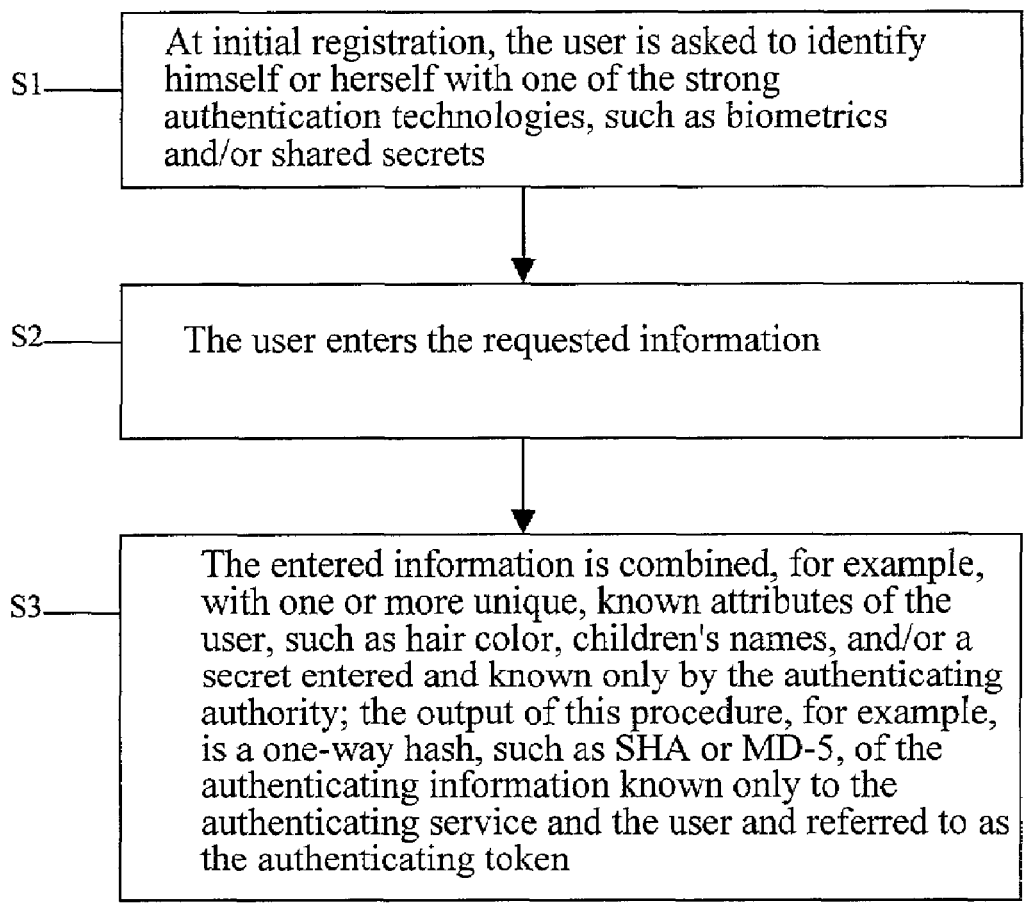
FIG. 4 is a flow chart which shows an example of the registration process for an embodiment of the present invention.

As illustrated in FIG. 2, the strongest authentication measures for an embodiment of the present invention, such as biometrics 16 and shared secrets 18, are used only for registration 10, which is a one-time (or very infrequent) procedure. FIG. 3 is a schematic diagram showing an example of key components and the flow of information between key components in the registration process 10, and FIG. 4 is a flow chart which shows an example of the registration process 10, for an embodiment of the present invention. Referring to FIG. 4, at S1, at initial registration 10, a user 20 is asked to identify himself or herself with one of the strong authentication technologies, such as biometrics 16 and/or shared secrets 18. At S2, the user 20 enters the requested information. At S3, this information can be combined, for example, with one or more unique, known attributes of the user 20, such as hair color, childrens' names, and/or a secret entered and known only by the authenticating authority 22. The output of this procedure is typically a one-way hash, such as Secure Hash Algorithm (SHA) or one of the MD series message digest algorithms (MD-5), of the authenticating information. The one-way hash is an operation that is easy to perform, but relatively difficult to reverse engineer. Thus, it is easy to create the hash from the input, but it is very difficult to determine the input from the hash. The authenticating service 22 and the user 20 are the only ones who know the output of this first one-way hash, or an index derived from the hash, referred to herein as the authenticating token.

The registration process 10 is where the authentication for an embodiment of the present invention is the strongest. The user 20 must register and establish that he or she is the owner, for example, of a particular account, utilizing a very strong registration process 10. The registration process 10 makes use, for example, of biometrics 16 and/or shared secrets 18 that are used only for registration 10. Shared secrets 18 include, for example, a special code included in the mailing of a user's bank statement that can be used, for example, only within the next day's time frame. Another way for a user 20 to identify himself or herself in the registration process 10 is to provide an answer to a question about a specific matter, which only the user 20 would know.

Figure 5:
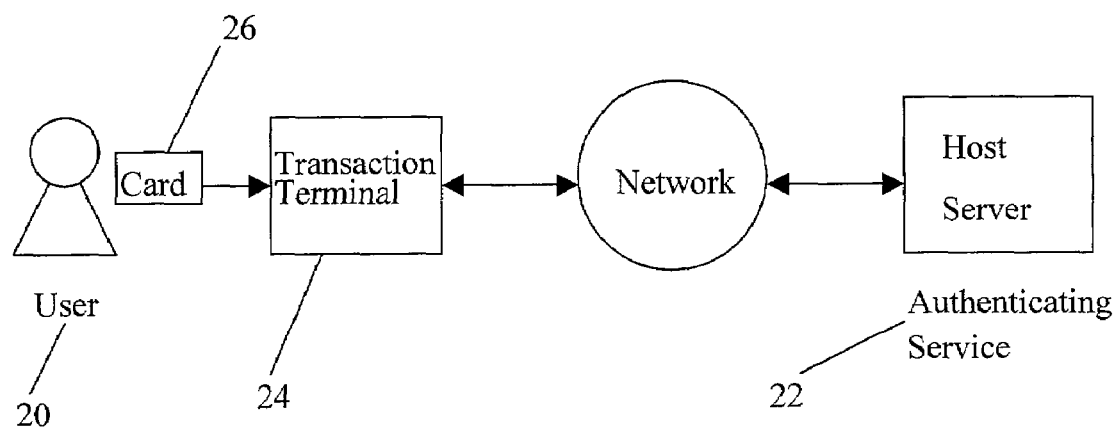
FIG. 5 is a schematic diagram which provides further detail regarding key components and the flow of information between key components in the registration process as shown in FIG. 3.

As shown in FIG. 5, the registration process can also involve the user 20 physically going to a transaction terminal 24, such as an automatic teller machine (ATM), and registering with a transaction terminal card 26 and a password. At that point, the user 20 provides other information by which he or she can easily be identified at a later time, such as the color of the user's hair or a secret number. In other words, the user 20 goes to a facility 24 to perform the registration 10 and identify himself or herself using a strong technique. For example, the user 20 goes to the facility 24, such as the ATM or other financial institution facility, to register using a technique, such as fingerprints, handwriting recognition, or other types of biometrics 16. The user 20 inputs his or her card number and/or personal identification number (PIN) through a control device 24 which identifies who the user 20 is, and the user 20 can add other secrets for future identification, which information is then hashed. That establishes a link between who the user 20 is and those other secrets, and it is difficult for a third party to forge.

Figure 6:
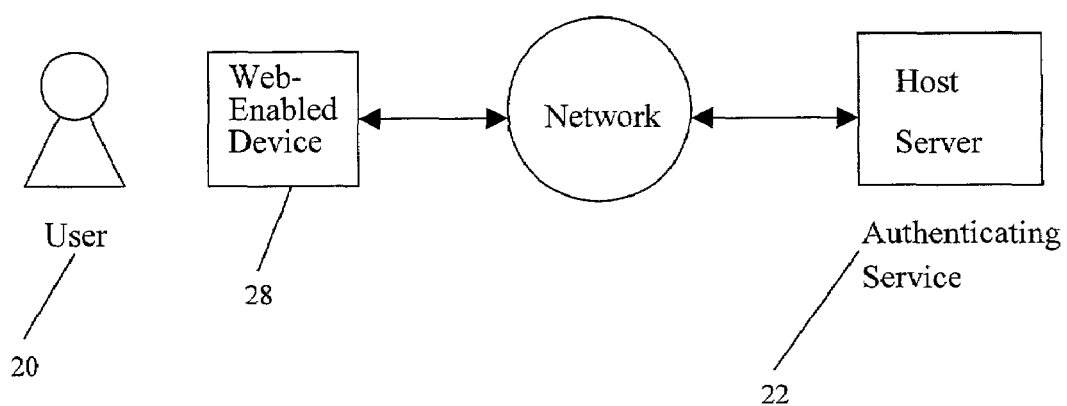
FIG. 6 is a schematic diagram showing an example of key components and the flow of information between key components in the enrollment process for an embodiment of the present invention.
Figure 7:
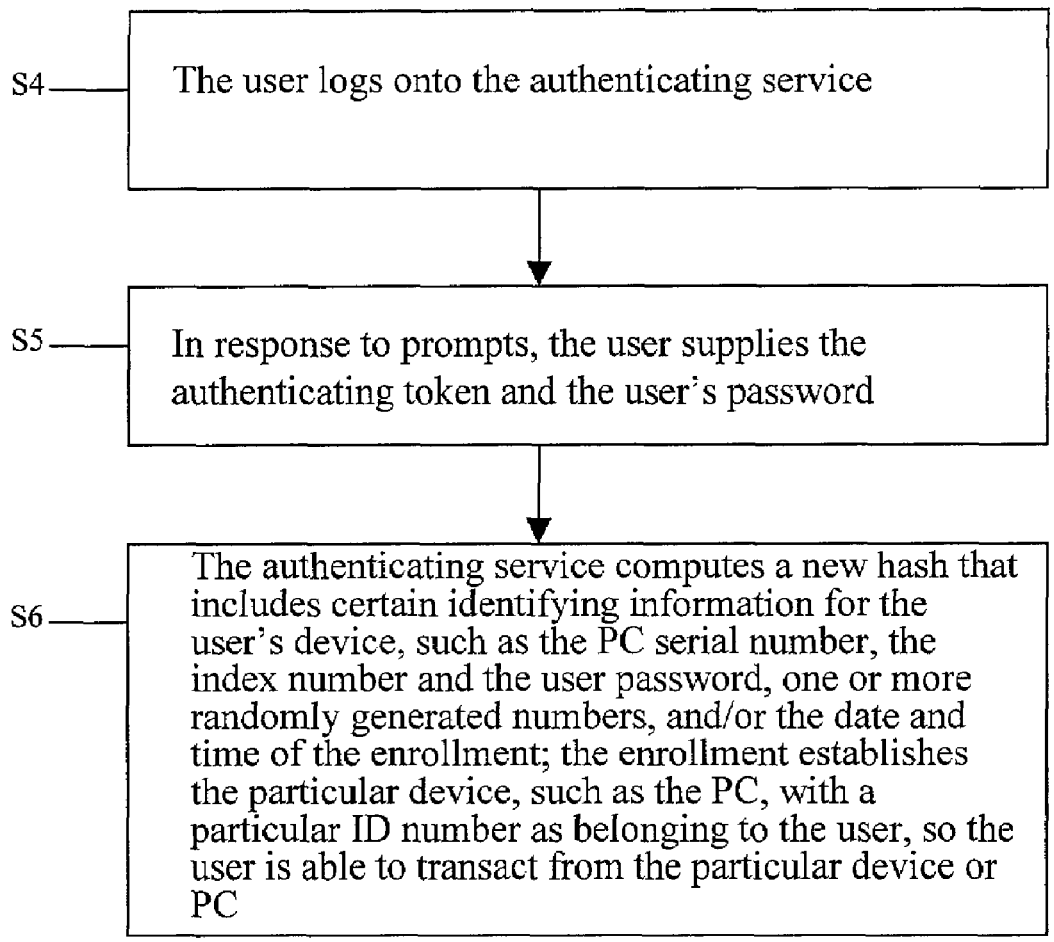
FIG. 7 is a flow chart which shows an example of the enrollment process for an embodiment of the present invention.

Regarding the enrollment stage 12 for an embodiment of the present invention, the output from the hash (for example, 20-bytes), or an index derived from the hash, is provided to the user 20 at S3 in the registration process 10, as shown in FIG. 4, to be used by the user 20, for example, as a one-time code for the user 20 to enroll himself/herself for a particular service. If the user 20 wishes to enroll for a service, the user 20 can be sent the one-time hash or index as a code which the user 20 can employ as a token to enroll one or more web-enabled devices 28, as shown in FIG. 6, such as one or more personal computers (PCs), set-top boxes, and/or palm pilots, from which the user 20 can perform transactions. FIG. 7 is a flow chart which shows an example of the enrollment process 12 for an embodiment of the present invention. Referring to FIG. 7, in order to enroll the device 28, at S4, the user 20 logs onto the authenticating service 22 and supplies the authenticating token and the user's password at S5 in response to prompts. At S6, a new hash is then computed that includes certain identifying information, such as the PC serial number, the index number and the user password, one or more randomly generated numbers, and/or the date and time of the enrollment. This is an authenticating token that can only be generated on the enrolled device 28 when activated with the user-supplied password. The user 20 can select different passwords for each enrolled device 28.

In other words, the user 20 registers himself or herself, saying in effect, "This is who I am, and I want to register myself for this service." The user 20 must identify himself or herself strongly with cards, biometrics, or the like at the time the user 20 enrolls device 28, such as the user's PC, and the authenticating service 22, such as a financial institution, returns a code to the user 20, which the user 20 can use to enroll his or her device 28, such as the PC. The enrollment establishes the particular PC 28 with a particular ID number as belonging to the user 20, and the user 20 is able to transact from that PC 28. The hash is a digest of the information, whether it includes biometrics 16 or some other type of information. The user 20 comes in and registers by authenticating his or her identity. In effect, the user 20 says, "I am the user in whatever way you, the bank, knows me", whether it is through use of the user's handwritten signature, the user's fingerprints, or some type of information that only the user 20 knows, because it was passed on from the user's last bank statement, or a combination of all of the above. The registration process 10 can be made as hard and intrusive as desired, because it is a one-time registration. Based upon the registration, the user 20 is furnished a code. The code can be a hash received back from the authenticating service 22, such as a bank, which has a time limit. It may be good only for a predefined period of time, and it comes back to the user 20 as a result of the registration. The user 20 can be furnished a series of these kinds of hashes, if desired, and the hashes avoid the user's having to return to the bank to enroll the user's devices 28.

In the aspect of enrolling a device 28 by the user 20, assume that the user 20 has, for example, a palm pilot and a lap top which the user 20 may carry with him or her, a PC at his or her office, and a set-top box at home. The user 20 is furnished the series of codes, which the user 20 can use accordingly. For example, the user 20 logs on at his or her PC and is asked by the financial institution 22 to identify himself or herself. The user 20 can furnish the financial institution 22 the one-time code for one-time use for enrollment, which is difficult for a third party to duplicate and copy or reverse-engineer. Thus, when the user 20 is asked for identification, the user 20 can respond with the secret 18, such as the hash, which the user 20 obtained when he or she registered, saying, in effect, "Here is the device (such as the PC) from which I am communicating."

In an embodiment of the present invention, the hash is used by the user 20 only for enrollment. When the user 20 logs on to an enrolled device 28 by entering his or her password, the user 20 is already enrolled. Once the user 20 is identified and enrolled to log on with a particular device 28, the user 20 can log on, for example, with an authenticated token or a password. The user 20 can take some identifying information in the device 28, such as a serial number or index number, and the password and use that information for the particular device 28 in the future with the particular password. Conceivably, the user 20 can have a different password for each device 28, if desired. If the user 20 wants to authenticate himself or herself on a guest machine (one that has not been enrolled), the user 20 must first perform a one-time enrollment, but none of the information entered by the user 20 is stored on the guest machine.

Figure 8:
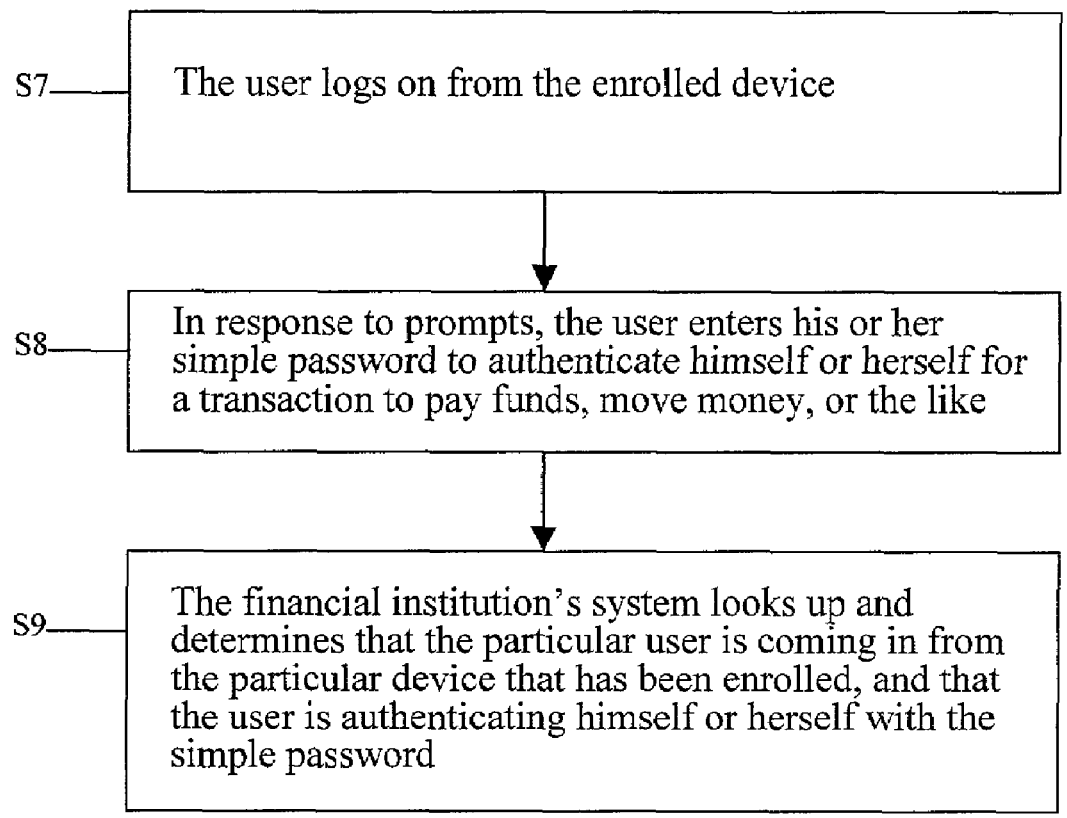
FIG. 8 is a flow chart which shows an example of the transaction authentication process for an embodiment of the present invention.

As shown in FIG. 4, registration 10 involves the process of uniquely identifying who the user 20 is and the user 20 receiving a series of one-time use codes that can be sent to the user 20 either at the time of registration, or via e-mail, or through the Postal Service or the like, as illustrated in FIG. 4. As shown in FIG. 7, the user 20 can then go to each device 28 from which the user 20 wants to transact and enroll the particular device 28 with passwords and IDs with which the user 20 intends to use the device 28. FIG. 8 is a flow chart which shows an example of the process of transaction authentication for an embodiment of the present invention. Referring to FIG. 8, at S7, the user 20 logs on from the enrolled device 28.

At S8, when the time arises for the user 20 to authenticate himself or herself for a transaction to pay funds, move money, or the like, at S9, the financial institution's system looks up and determines that the particular user 20 is coming in from the particular device 28 that has been enrolled, and that the user 20 is authenticating himself or herself with the simple password.

In an embodiment of the present invention, if a third party compromises the password, the user 20 can go back through the enrollment process 12 and re-enroll or use a different enrolled device 28. The particular password is good only with the particular device 28, such as the user's PC. If the user 20 has reason to believe the password is compromised, he or she can simply turn off the compromised PC and re-enroll with a new password associated with the user's PC. In that case, the user 20 must go back to the more difficult, more intrusive process. Thus, the process is performed in stages, such as first identifying who the user 20 is and furnishing the user 20 one-time codes that allow the user 20 to enroll a device 28. When the user 20 enrolls a particular device 28, the user 20 selects some simple passwords that are easy to remember and use and that enable the user 20 to activate the particular device 28 to perform certain functions. Activation is very simple, and the information can be loaded into the user's device 28, so that the user 20 needs only to click.

In an aspect of an embodiment of the present invention, whether or not the device 28 is something which the user 20 can carry about with him or her, if the device 28 or the passwords for the particular device 28 become compromised, the user 20 must go back and duplicate either the enrollment procedure 12 or the registration procedure 10 to re-enroll the device 28 or to change the parameters about it. The password can become compromised, for example, in two ways. One way is for a third party to steal the device 28, and if the device 28 itself does not require a password to unlock it, the third party can use the device 28 at will, somewhat like a transaction card, such as a magnetic stripe card. Thus, if a third party steals the particular device 28 and the user 20 does not have it locked up with a password, the user 20 must come in through one of the other, more secure procedures, such as the enrollment process 12 or the registration process 10, to inform the financial institution 22 that the particular device 28 is not valid any more, will not be used, and should be de-enrolled. In this aspect, if the device 28, for example, is a PC that is not normally carried around by the user 20, the third party does not necessarily have to steal the device 28 to compromise it. Rather, if the PC 28 is not locked with a password, the third party can simply walk into the user's office when the user 20 is absent and start transacting from the PC 28. For a device, such as a PC, that is always on a network, it is also possible for the PC to become infected with a virus program that sits and watches what the user 20 does and takes over control of the PC, in which case, the PC 28 becomes compromised.

In the transaction authentication aspect 14 for embodiment of the present invention, whether or not the device 28 is protected, when a transaction occurs from the device 28 with some unique token that the user 20 installed, the transaction is considered to be good. In that case, anyone who gets control of the device 28 in any way, either remotely, or by stealing it, or by simply sneaking in when the user 20 is absent, can transact on the user's part. If the user 20 locks up the device 28 with something simple, such as a password, it is possible that the third party can guess it. However, that is a worthwhile risk to take. While that leaves the user 20 vulnerable to a transaction on the particular device 28, when the user 20 discovers that the device 28 is either stolen, or has been taken over, for example, by a virus, or a transaction has occurred that was not one of the user's transactions, the user 20 can immediately de-enroll that device 28 so that no further damage can be done. The financial institution 22 can inform the user 20 that he or she needs to re-enroll, or the user 20 can do it for himself or herself, for example, at an ATM machine or the like.

The registration stage 10 for an embodiment of the present invention is the strongest process that takes precedence over the subsequent stages. In other words, a tier is created which says that once the user 20 has established his or her identity, the user 20 can go to the stage of enrolling 12 and de-enrolling, and modifying the enrollment parameters at will. Since the enrollment level 12 is more secure and not frequently used, even if a third party captures the information which the third party needs to take over control of the user's device 28, the third party has not captured the information that controls the enrollment and de-enrollment process.

In an embodiment of the present invention, there are only certain ways that someone can defeat the user 20 at the transaction level 14, such as stealing the user's device 28 or guessing the password, or taking control of the user's device 28. Thus, if the user 20 watches and monitors his or her transactions and begins to see transactions that are suspicious and not instituted by the user 20, the user 20 knows that his or her device 28 is compromised. In the interest of simplicity, the authentication process 14 for the particular device is made very fast and easy. In recognition of the fact that, from time to time, it is possible that the user's device 28 might become compromised, the financial institution 22 can elect to absorb the loss, as it does, for example, with a counterfeit card transaction, or the financial institution 22 can at least minimize the loss for user 20. In any event, once the device 28 is compromised, it is turned off as rapidly as possible so that no one can transact at the particular device 28 any longer, and the user 20 must go back and perform a re-enrollment. It is not a burden to the user 20, as it is not an everyday occurrence and is only required when a problem arises.

In another aspect of an embodiment of the present invention, out of an abundance of caution, the financial institution 22 can require the user 20 to come in from time to time and re-enroll and get new secrets 18 for protection. When the re-enrollment comes in from the user 20, it comes through another channel, and the user 20 furnishes secrets that are normally known only by the particular user 20. The user 20 can re-enroll, for example, every time the user 20 goes to a transaction terminal 24, such as an ATM machine, which is a more secure way to furnish new numbers to the user 20. For example, if the user 20 does enrollment from an ATM machine 24, where the user 20 must physically come into a financial institution facility and use his or her card 26, every time the user 20 comes in and performs a transaction, the user 20 can re-enroll and receive a code number to use for the next time he or she re-enrolls. Thus, the user 20 re-establishes that the device 28, such as the particular PC and palm pilot are still the user's, and the user's password is redone, or the device 28 is re-established, and the user 20 is given a new code for the device 28. Thus, if someone copies or steals the old code, it is no longer good.

In an embodiment of the present invention, things that must be done by the user 20 that are more intrusive, such as having to physically go to an ATM machine 24 or the like, or physically using some type of a biometric 16 to prove who the user 20 is, are required to be done with relatively less frequency. That is used to modulate and change the simpler things which are triggered, for example, by the click of a mouse. If the user 20 is able to get into the user's device 28, such as his or her password-protected PC or palm pilot, it is good enough.

In an aspect of the present invention, once the user 20 enrolls a device 28, such as a PC, a Web enabled wireless phone, and/or a palm pilot, that alone can become an added protection, which allows the enrollment to be done a little more conveniently. For example, the user 20 can come in to register three devices 28 which he or she wants to enroll. In order to prove who the user 20 is, he or she uses, for example, his or her card 26 and handwritten signature and is given three codes to enroll the three devices 28. Once the user 20 has enrolled these three devices 28, then the financial institution 22 knows that it can identify the three devices 28 with the user 20. In the future, rather than having to come to the financial institution 22, the user 20 can use any two of the devices 28, for example, to change the enrollment of any one of the devices 28. In this aspect, the user 20 can use those two devices 28 to authenticate himself or herself for re-enrollment. Thus, if a third party steals the user's PC, but not the user's palm pilot or Internet phone, an attempt by the third party to change things from the PC will not be successful. It is necessary for the third party to physically steal three things, because the financial institution 22 will allow the user 20 to change enrollment, for example, by sending the same control message three different ways. That does not present a difficulty for the user 20, who is in possession, for example, of his or her cell phone, PC and palm pilot. Thus, there are three transactions saying the same thing, and if the financial institution 22 sees only one out of three, it knows that the transaction is unauthorized. If it sees two out of the three transactions, it knows that it is unlikely to be compromised. If it sees three out of the three transactions, then the financial institution 22 knows either that none are compromised or that all three are compromised, which is highly unlikely.

In another aspect of the present invention, the user 20 can use two of the user's devices 28, for example, to enroll a device while the user 20 is traveling. For example, the user 20 may take a trip and desire to use a hotel PC. The user 20 can use those devices with the simple authentication that was furnished to the user 20 by the financial institution 22, or the user 20 can use two out of three of the user's devices 28 to obtain a new enrollment code. When the user 20 comes to the hotel PC, he or she can use the new code, referred to as a roaming code, to say to the financial institution 22, in effect, "I am in a hotel on a trip, and here is my one-time use roaming code." As a result of that, the financial institution 22 can give the user 20 a different code, so the user 20 can transact with the new code at another hotel on the next day. In this aspect, for such a device that is not normally carried with the user 20, the user 20 is able to get a one-time kind of enrollment, and the next time the user 20 wants to use that device, he or she uses it as a guest. With the one-time enrollment, nothing is stored in the particular device. Everything is encrypted, and if a third party captures the authentication code, it is of no use to the third party because the next time the user 20 uses a device, he or she uses a different code.

An advantage of the strong convenient authentication process for an embodiment of the present invention is that the user 20 is authenticated by strong authentication information, but the information is kept secure, since it is used only in the registration phase 10, which is typically a one-time or very infrequent process. The individual transaction authentication 14 is very fast and convenient, and if any compromise arises during the authentication process, the user 20 can easily be re-enrolled without compromising any of the stronger authentication information used in the registration process 10.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for authenticating a web user, comprising:
registering the user by an authenticating authority based upon identification of the user using a strong authentication technique;
providing an authenticating token to the user by the authenticating authority in connection with the user registration;
enrolling at least one web-enabled user device for the user by the authenticating authority based on presentation of the authenticating token by the user;
authenticating the user for a transaction by the authenticating authority based on presentation by the user of a user password via the enrolled user device;
wherein registering the user based upon identification of the user using the strong authentication technique further comprises registering the user based upon identification of the user using at least one of biometric information and shared secret information; and
wherein registering the user based upon identification of the user using shared secret information further comprises registering the user based upon identification of the user using a special code posted by the authenticating authority to the user that can be used only within a predetermined time frame.

2. The method of claim 1, wherein registering the user based upon identification of the user using shared secret information further comprises registering the user based upon identification of the user using the user's answer to a question posed by the authenticating authority about a specific matter which only the user would know.

3. The method of claim 1, wherein registering the user based upon identification of the user using at least one of the biometric information and the shared secret information further comprises combining the information with at least one of a unique, known attribute of the user and a secret entered and known only by the authenticating authority.

4. The method of claim 1, wherein registering the user based upon identification of the user using at least one of the biometric information and the shared secret information further comprises receiving the information from the user at a transaction terminal.

5. The method of claim 4, wherein receiving the information from the user at a transaction terminal further comprises allowing the user to enter the information at the transaction terminal using a transaction terminal card and a user password.

6. The method of claim 5, wherein allowing the user to enter the information at the transaction terminal using the transaction terminal card and the user password further comprises allowing the user to enter the information at the transaction terminal using the transaction terminal card and a personal identification number of the user through a control device that identifies the user.

7. The method of claim 4, wherein receiving the information from the user at a transaction terminal further comprises allowing the user to enter the biometric information consisting of at least one of fingerprint information and handwriting information at the transaction terminal.

8. The method of claim 1, wherein providing the authenticating token further comprises providing the authenticating token to the user consisting of a one-way hash of user identification information known only to the authenticating authority and the user.

9. The method of claim 8, wherein providing the authenticating token consisting of the one-way hash further comprises producing the one-way hash of user identification information consisting of at least one of biometric information and shared secret information.

10. The method of claim 9, wherein providing the authenticating token further comprises producing the one-way hash of the user identification information by the authenticating authority using one of a Secure Hash Algorithm (SHA) or a message digest algorithm (MD-5).

11. The method of claim 9, wherein providing the authenticating token further comprises producing the authenticating token consisting of an index derived from the one-way hash.

12. The method of claim 1, wherein enrolling the web-enabled user device based on presentation of the authenticating token further comprises enrolling the web-enabled user device based on presentation of the authenticating token consisting of a one-way hash of user identification information known only to the authenticating authority and the user.

13. The method of claim 12, wherein enrolling the web-enabled user device based on presentation of the authenticating token further comprises enrolling at least one computing device from which the user can perform transactions.

14. The method of claim 13, wherein enrolling at least one computing device further comprises enrolling at least one of a laptop computer, a personal computer (PC), a set-top box, and a personal data assistant for the user.

15. The method of claim 1, wherein enrolling the web-enabled user device based on presentation of the authenticating token further comprises allowing the user to log onto a web site for the authenticating authority and supply the authenticating token and a user password to the authenticating authority.

16. The method of claim 15, wherein enrolling the web-enabled user device based on presentation of the authenticating token further comprises producing a hash of user information consisting of at least identification information for the user device and the user password.

17. The method of claim 1, wherein authenticating the user based on presentation by the user of the user password via the enrolled user device further comprises receiving a hash of user information by the authenticating authority via the enrolled user device consisting of at least identification information for the user device.

18. The method of claim 17, wherein authenticating the user based on presentation by the user of the user password via the enrolled user device further comprises performing a look-up by the authenticating authority to confirm a predefined relationship between the user password and the enrolled user device.

19. A system for authenticating a web user, comprising:
means for registering the user by an authenticating authority based upon identification of the user using a strong authentication technique;
means for providing an authenticating token to the user by the authenticating authority in connection with the user registration;
means for enrolling at least one web-enabled user device for the user by the authenticating authority based on presentation of the authenticating token by the user;
means for authenticating the user for a transaction by the authenticating authority based on presentation by the user of a user password via the enrolled user device;
wherein the means for registering the user based upon identification of the user using the strong authentication technique further comprises means for registering the user based upon identification of the user using at least one of biometric information and shared secret information; and
wherein the means for registering the user based upon identification of the user using shared secret information further comprises means for registering the user based upon identification of the user using a special code posted by the authenticating authority to the user that can be used only within a predetermined time frame.

20. The system of claim 19, wherein the means for registering the user based upon identification of the user using shared secret information further comprises means for registering the user based upon identification of the user using the user's answer to a question posed by the authenticating authority about a specific matter which only the user would know.

21. The system of claim 19, wherein the means for registering the user based upon identification of the user using at least one of the biometric information and the shared secret information further comprises means for combining the information with at least one of a unique, known attribute of the user and a secret entered and known only by the authenticating authority.

22. The system of claim 19, wherein the means for registering the user based upon identification of the user using at least one of the biometric information and the shared secret information further comprises means for receiving the information from the user at a transaction terminal.

23. The system of claim 22, wherein the means for receiving the information from the user at a transaction terminal further comprises means for allowing the user to enter the information at the transaction terminal using a transaction terminal card and a user password.

24. The system of claim 23, wherein the means for allowing the user to enter the information at the transaction terminal using the transaction terminal card and the user password further comprises means for allowing the user to enter the information at the transaction terminal using the transaction terminal card and a personal identification number of the user through a control device that identifies the user.

25. The system of claim 22, wherein the means for receiving the information from the user at a transaction terminal further comprises means for allowing the user to enter the biometric information consisting of at least one of fingerprint information and handwriting information at the transaction terminal.

26. The system of claim 19, wherein the means for providing the authenticating token further comprises means for providing the authenticating token to the user consisting of a one-way hash of user identification information known only to the authenticating authority and the user.

27. The system of claim 26, wherein the means for providing the authenticating token consisting of the one-way hash further comprises means for producing the one-way hash of user identification information consisting of at least one of biometric information and shared secret information.

28. The system of claim 27, wherein the means for providing the authenticating token further comprises means for producing the one-way hash of the user identification information by the authenticating authority using one of a Secure Hash Algorithm (SHA) or a message digest algorithm (MD-5).

29. The system of claim 27, wherein the means for providing the authenticating token further comprises means for producing the authenticating token consisting of an index derived from the one-way hash.

30. The system of claim 27, wherein the means for enrolling the web-enabled user device based on presentation of the authenticating token further comprises means for enrolling the web-enabled user device based on presentation of the authenticating token consisting of a one-way hash of user identification information known only to the authenticating authority and the user.

31. The system of claim 30, wherein the means for enrolling the web-enabled user device based on presentation of the authenticating token further comprises means for enrolling at least one computing device from which the user can perform transactions.

32. The system of claim 31, wherein the means for enrolling at least one computing device further comprises means for enrolling at least one of a laptop computer, a personal computer (PC), a set-top box, and a personal data assistant for the user.

33. The system of claim 27, wherein the means for enrolling the web-enabled user device based on presentation of the authenticating token further comprises means for allowing the user to log onto a web site for the authenticating authority and supply the authenticating token and a user password to the authenticating authority.

34. The system of claim 33, wherein the means for enrolling the web-enabled user device based on presentation of the authenticating token further comprises means for producing a hash of user information consisting of at least identification information for the user device and the user password.

35. The system of claim 27, wherein the means for authenticating the user based on presentation by the user of the user password via the enrolled user device further comprises means for receiving a hash of user information by the authenticating authority via the enrolled user device consisting of at least identification information for the user device.

36. The system of claim 35, wherein the means for authenticating the user based on presentation by the user of the user password via the enrolled user device further comprises means for performing a look-up by the authenticating authority to confirm a pre-defined relationship between the user password and the enrolled user device.

* * * * *